(12) United States Patent
Dhuey et al.

(10) Patent No.: US 7,710,450 B2
(45) Date of Patent: May 4, 2010

(54) SYSTEM AND METHOD FOR DYNAMIC CONTROL OF IMAGE CAPTURE IN A VIDEO CONFERENCE SYSTEM

(75) Inventors: Michael J. Dhuey, Cupertino, CA (US); Philip R. Graham, Milpitas, CA (US); Richard T. Wales, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 367 days.

(21) Appl. No.: 11/456,339

(22) Filed: Jul. 10, 2006

(65) Prior Publication Data

US 2007/0263077 A1 Nov. 15, 2007

Related U.S. Application Data

(60) Provisional application No. 60/794,016, filed on Apr. 20, 2006.

(51) Int. Cl.
*H04N 7/14* (2006.01)
*H04N 5/232* (2006.01)

(52) U.S. Cl. .............. 348/14.08; 348/14.11; 348/14.12

(58) Field of Classification Search ... 348/14.01–14.16, 348/211.99, 296, 333.02
See application file for complete search history.

(56) References Cited

U.S. PATENT DOCUMENTS

| | | | |
|---|---|---|---|
| 5,343,241 A | 8/1994 | Richards et al. ............... 348/97 |
| 5,389,965 A * | 2/1995 | Kuzma ..................... 348/14.05 |
| 5,574,934 A | 11/1996 | Mirashrafi et al. .......... 709/207 |
| 5,598,209 A | 1/1997 | Cortjens et al. ............. 348/211 |
| 5,712,474 A | 1/1998 | Naneda .................... 250/208.1 |
| 5,818,514 A | 10/1998 | Duttweiler et al. ......... 348/14.1 |
| 5,859,979 A | 1/1999 | Tung et al. .................. 709/228 |
| 5,898,457 A * | 4/1999 | Nagao et al. ............... 348/14.1 |
| 5,956,509 A | 9/1999 | Kevner ....................... 719/330 |
| 6,075,543 A | 6/2000 | Akeley ....................... 345/539 |
| 6,177,922 B1 | 1/2001 | Schiefer et al. ............. 345/698 |
| 6,212,206 B1 | 4/2001 | Ketcham .................... 370/516 |
| 6,278,478 B1 * | 8/2001 | Ferriere ..................... 348/14.1 |

(Continued)

FOREIGN PATENT DOCUMENTS

EP 1 217 602 A2 6/2002
EP 1 628 480 A2 2/2006

OTHER PUBLICATIONS

Notification of Transmittal of the International Search Report and the Written Opinion of the ISA, or the Declaration; ISA/US regarding PCT/US07/70482 (9 pages), Jan. 22, 2008.

(Continued)

*Primary Examiner*—Melur Ramakrishnaiah
(74) *Attorney, Agent, or Firm*—Baker Botts L.L.P.

(57) ABSTRACT

A system and method are provided for capturing and transmitting frames in a video conference. The method comprises determining a frame rate and a shutter speed according to variable control data, capturing image data according to the determined shutter speed, and transmitting the captured image data through a communication interface to a remote video conference system. The variable control data specifies a relationship between the frame rate and the shutter speed.

18 Claims, 2 Drawing Sheets

U.S. PATENT DOCUMENTS

| | | |
|---|---|---|
| 6,289,390 B1 | 9/2001 | Kavner ........................ 719/310 |
| 6,346,970 B1 | 2/2002 | Boehlke ...................... 348/447 |
| 6,445,411 B1 | 9/2002 | Shibata et al. .............. 348/213 |
| 6,795,106 B1 | 9/2004 | Cooper ......................... 348/14 |
| 6,806,898 B1 | 10/2004 | Toyama et al. ................ 348/16 |
| 6,970,198 B1 | 11/2005 | Schinner et al. ........ 348/333.01 |
| 7,075,564 B1 | 7/2006 | Jewell et al. ............... 348/14.1 |
| 7,119,811 B2 | 10/2006 | Ernst et al. ................... 345/545 |
| 2004/0049793 A1 | 3/2004 | Chou ........................... 725/87 |
| 2004/0136459 A1 | 7/2004 | Yavits et al. ........... 375/240.12 |
| 2004/0240436 A1 | 12/2004 | Yao et al. ..................... 370/352 |
| 2005/0018927 A1* | 1/2005 | Manabe ...................... 382/294 |
| 2005/0024369 A1 | 2/2005 | Xie ............................. 345/547 |
| 2005/0163116 A1 | 7/2005 | Anderson et al. ........... 370/389 |
| 2005/0195206 A1 | 9/2005 | Wogsberg ................... 345/547 |
| 2005/0259179 A1 | 11/2005 | Robertson et al. ........... 348/367 |
| 2006/0203730 A1 | 9/2006 | Zur ............................. 370/235 |
| 2007/0247470 A1 | 10/2007 | Dhuey et al. ................ 345/545 |

OTHER PUBLICATIONS

Supplemental European Search Report for PCT/US2007/009310; EPO, 8 pages, Apr. 23, 2009.

Dhuey et al., USSN 11/456,298 filed Jul. 10, 2006, communication from the U.S. Patent and Trademark Office mailed Jul. 24, 2008.

Dhuey et al., USSN 11/456,298 filed Jul. 10, 2006, communication from the U.S. Patent and Trademark Office mailed Feb. 4, 2009.

Dhuey et al., USSN 11/456,298 filed Jul. 10, 2006, communication from the U.S. Patent and Trademark Office mailed Jul. 20, 2009.

Communication Pursuant to Article 94(3) EPC issued by the EPO; Reference: P32635EP-PCT; Application No./Patent No. 07755542.3-1228/2013867, Sep. 18, 2009.

* cited by examiner

SYSTEM AND METHOD FOR DYNAMIC CONTROL OF IMAGE CAPTURE IN A VIDEO CONFERENCE SYSTEM

RELATED APPLICATIONS

This application claims priority to U.S. Patent Application Ser. No. 60/794,016, entitled "VIDEOCONFERENCING SYSTEM," which was filed on Apr. 20, 2006.

TECHNICAL FIELD

This invention relates in general to communications, and more particularly to a system and method for dynamic control of image capture in a video conference system.

BACKGROUND

Video conferencing, also known as video teleconferencing, is a form of visual collaboration that has existed in some form or another since the introduction of the television. Primitive forms of video conferencing were demonstrated with closed circuit television systems using cable. NASA also implemented a primitive form of video conferencing during the first manned space flights, using multiple radio links.

Such techniques, however, proved to be too expensive and otherwise impractical for more mundane applications, such as business meetings. Video conferencing did not become a viable communication option for these applications until improvements in bandwidth and compression techniques in the 1980s and 1990s enabled practical transmission over digital networks. Finally, IP-based communication systems emerged as a common conferencing medium in the late 1990s.

Today, video conferencing applications are spreading throughout the business and healthcare industries, as well as the general public. The underlying technology continues to evolve, however, and new processes and systems need to be developed to improve the quality, reliability, and simplicity of this cutting edge communications medium.

SUMMARY

In accordance with the present invention, certain disadvantages and problems associated with the quality of video conference systems have been substantially reduced or eliminated. In particular, the present invention significantly improves the quality of video conference systems through a system and method for reducing blur in image capture.

In accordance with one embodiment of the present invention, a method is provided for capturing and transmitting frames in a video conference. The method comprises determining a frame rate and a shutter speed according to variable control data, capturing image data according to the determined shutter speed, and transmitting the captured image data through a communication interface to a remote video conference system. The variable control data specifies a relationship between the frame rate and the shutter speed.

In accordance with another embodiment of the present invention, a system is provided for capturing and transmitting frames in a video conference. The system comprises an image data interface, a communication interface, and a controller coupled to the image data interface and to the communication interface. The controller is operable to receive variable control data through the communication interface, capture image data through the image data interface according to a variable shutter speed parameter in the control data, and transmit the captured image data through the communication interface to a remote video conference system.

An advantage of certain embodiments is the ability of conference participants to control image capture characteristics of a remote imaging device. More particularly, conference participants may dynamically adjust image capture parameters to control blur and strobe effects of images that are captured and transmitted from a remote conference location. Accordingly, conference participants may dynamically compensate for individual preferences, as well as varying degrees of motion by remote participants.

Other technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

The principles of the present invention may be implemented in a variety of hardware and software configurations. As is commonly understood in the art, the structure for implementing the functions described below may comprise any appropriately configured data processing hardware, software, process, algorithm, or combination thereof. Moreover, the structure and functions may be consolidated in a single physical device or distributed across many physical devices.

Additionally, certain embodiments are described below with reference to an exemplary network of functional elements. Each such functional element may represent a hardware device, software, process, or any combination thereof. A "network" comprises any number of these functional elements coupled to and in communication with each other through a communications medium. A "communications medium" includes without limitation any conductive, optical, electromagnetic, or other medium through which a functional element can transmit data. Unless otherwise indicated in context below, all network nodes may use publicly available protocols or messaging services to exchange signals, messages, and other forms of electronic communication with each other through a network.

Software and data structures associated with certain aspects typically are stored in a memory, which may be coupled to a functional element directly or remotely through a network. The term "memory," as used herein, includes without limitation any volatile or persistent medium, such as an electrical circuit, magnetic disk, or optical disk, in which a data or software may be stored for any duration. A single memory may encompass and be distributed across a plurality of media.

Figure 1:
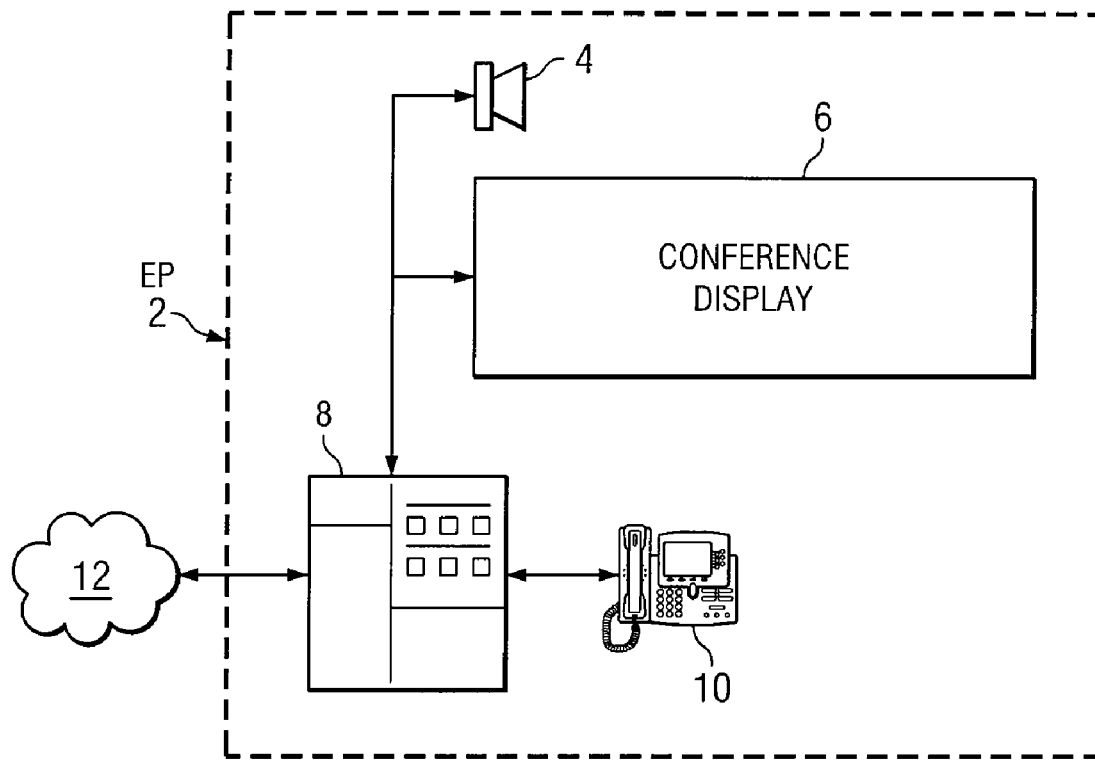
FIG. 1 is a simplified block diagram of an endpoint in a video conference system.

FIG. 1 is a simplified block diagram of an endpoint 2 in a video conference system in which the invention may operate. Endpoint 2 is provided for illustrative purposes only, as the configuration and elements of video conference systems may vary widely. The functional elements of endpoint 2 may include, without limitation, video capture device 4, conference display 6, endpoint controller 8, and user interface 10. Typically, an endpoint further includes an element for audio input (e.g., a microphone) and audio output (e.g., speakers). Video capture device 4 represents any imaging device or video input element operable to receive image data and produce an image frame, such as a digital video camera. Conference display 6 represents any video output element operable to display images, while user interface 10 represents any functional element operable to interact with an end-user (particularly a conference participant).

Endpoint controller 8 represents any functional element operable to communicate with other elements of a video conference system, including local elements such as video capture device 4 and remote elements coupled through a network interface across a network 12. Endpoint controller 8 generally is operable to establish media sessions with a remote video conference system endpoint across network 12. In certain embodiments, endpoint controller 8 also controls the behavior of user interface 10 and receives user input from user interface 10. Endpoint controller 8 may further comprise a codec, which is any functional element operable to compress/decompress media streams (including image data) associated with a conference.

Certain embodiments of the present invention contemplate operation in an environment of a conventional audio and video conferencing system. Other embodiments, though, are intended to operate in conjunction with conferencing elements designed to provide an experience that simulates a face-to-face conference. For instance, such elements may comprise one or more high-definition screens of sufficient dimensions to display life-size images of conference participants, while audio components provide high-definition surround sound. Such an experience is referred to herein as a "telepresence" conference to convey the concept of a conferencing system that surpasses the quality and experience of conventional video conferencing experiences.

In general, conferencing systems operate by establishing a media session between two endpoints, particularly across a network. FIG. 1 may be representative of both endpoints, but as already noted, the precise configuration of endpoints may vary widely. Once the endpoints establish a media session, they each employ various elements to capture and convey media data, such as audio and video data. The media data is then transferred between the two endpoints across the network as a media stream. The receiving endpoint then conveys the media data to conference participants through an appropriate output device (e.g., conference display 6). As described below, certain embodiments of the invention provide a mechanism for interactively controlling the capture and transfer of the media data.

Figure 2:
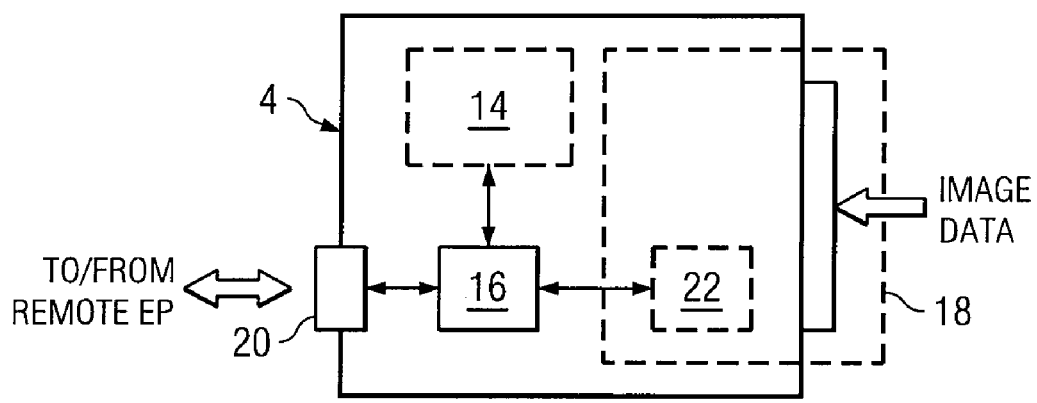
FIG. 2 is a simplified block diagram of a video capture device in the endpoint of FIG. 1.

FIG. 2 is a simplified block diagram of video capture device 4 in the endpoint of FIG. 1. Video capture device 4 generally comprises a memory 14, an image controller 16, and an image capture interface 18. In certain embodiments, video capture device 4 also may include a communication interface 20.

In one embodiment, image capture interface 18 comprises a light sensor 22 and a shutter (not pictured). The shutter may be a physical mechanism, or it may be a virtual (or electronic) shutter. Image controller 16 opens a physical shutter to expose light to light sensor 22, and closes the shutter to interrupt light reaching light sensor 22. In contrast, image controller 16 may operate an electronic shutter simply by instructing light sensor 22 to collect image data for a given time, and then possibly ignore it for a given time. The term "shutter speed" generally refers to the length of time that light sensor 22 collects the image data. Image controller 16 converts light information from light sensor 22 into image data, which is typically stored in memory 14. Image data representing a single image generally is referred to as a "frame."

Communication interface 20 represents any functional element operable to connect to other functional elements for transferring data in digitized or analog signal form, and may include without limitation an Ethernet interface, air link, infrared link, serial port, or parallel port. Communication interface 20 may be coupled to a remote endpoint of a video conference system, either directly or indirectly. As FIG. 1 illustrates, communication interface 20 may couple video capture device 4 to a remote endpoint indirectly through endpoint controller 8, which is coupled to network 12. Image controller 16 may receive control data from the remote endpoint through communication interface 20, and may transmit frames through communication interface 20 to a remote endpoint for viewing by other conference participants. The rate at which image controller 16 transmits frames is referred to herein as the "frame transmission rate." The frame transmission rate may be the same as the frame capture rate. Collectively, the frame transmission rate and the frame capture rate are referred to as the "frame rate."

Shutter speed generally affects the characteristics of a given image. In particular, shutter speed affects "blur" and "strobe" characteristics. Given a certain frame capture rate, for example, a relatively high shutter speed may produce clear images that appear to strobe (i.e. move discontinuously) when displayed. In contrast, a lower shutter speed may produce images that appear continuous, but blurred when displayed. These effects may be compounded even further by rapid motion (i.e. significant changes between frames). To accommodate varying degrees of motion, as well as individual preferences of conference participants, various embodiments of the invention provide a mechanism for dynamically controlling the shutter speed and/or frame rate to adjust these blur and strobe effects (as described in greater detail below).

Figure 3:
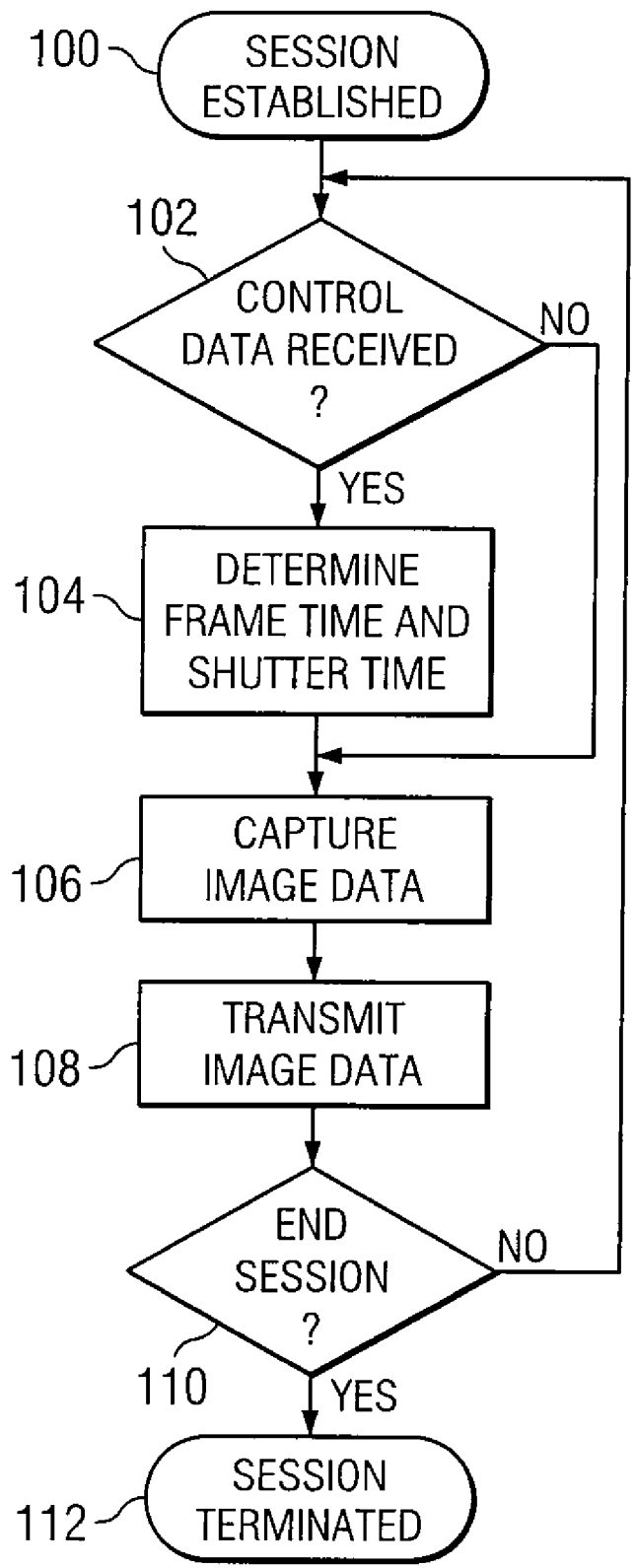
FIG. 3 is a flowchart that illustrates an example operation of the video capture device of FIG. 2.

FIG. 3 is a flowchart that illustrates an example operation of video capture device 4 that dynamically controls the shutter speed and/or frame rate during a video conference. In step 100, endpoint controller 8 establishes a media session with a remote endpoint. In step 102, image controller 16 receives control data. In step 104, image controller 16 processes control data to determine an appropriate shutter speed and frame rate. In step 106, image controller 16 operates the shutter to capture image data and generate a frame according to the shutter speed and frame rate determined in step 104. In step 108, image controller 16 transmits the image data through communication interface 20. Image controller 16 repeats steps 102-108 until determining that the session has been terminated (steps 110-112).

The control data referenced above may represent static, pre-configured data, or it may represent dynamic control data generated as the result of end-user actions associated with either image controller 16 or a remote endpoint. For example, image controller 16 or the remote endpoint may by coupled to a user interface having a dial, slide bar, free-form input field, or the like for an end-user to control the image characteristics. The control data generally comprises variable parameters that determine a relationship between the shutter speed and frame rate (or frame time). In some embodiments, the relationship is the result of independent parameters, while in others the relationship represents a ratio of one parameter to the other. In one embodiment, for example, control data comprises an independent or absolute representation of a variable shutter speed and a fixed frame rate (or vice versa). In an alternate embodiment, though, control data may represent a ratio or percentage of shutter speed to frame rate, blur to strobe, or any other suitable metric.

In certain embodiments, control data may be received through communication interface 20 from a remote endpoint (thereby allowing remote control of image characteristics), or from endpoint controller 8. Alternatively, image controller 16 may retrieve control data from memory 14.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A video conferencing system comprising:
   a digital video camera; and
   a video conference controller coupled to the digital video camera, the video conference controller operable to:
   establish a video conference session with a remote endpoint;
   receive control data from the remote endpoint, the control data comprising a first plurality of variable parameters that establish a relationship between a frame rate and a shutter speed;
   generate a plurality of digital video frames from the digital video camera according to the frame rate and the shutter speed; and
   transmit the plurality of digital video frames to the remote endpoint in conjunction with the video conference session.

2. The video conferencing system of claim 1, further comprising:
   a display operable to display video information received from the remote endpoint; and
   a user interface operable to provide a control to enable selection of a second plurality of variable parameters, wherein the video conference controller is further operable to relay the second plurality of variable parameters to the remote endpoint to dynamically affect the displayed video information in real time in response to selection of the control.

3. A method of capturing and transmitting frames in a video conference, the method comprising:
   receiving control data from a remote video conference system, the control data comprising a plurality of variable parameters that establish a relationship between a frame rate and a shutter speed;
   generating a plurality of digital video frames according to the frame rate and the Shutter speed; and
   transmitting the plurality of digital video frames through a communication interface to the remote video conference system.

4. The method of claim 3, wherein the control data is received from the remote video conference system through the communication interface.

5. The method of claim 3, wherein the control data comprises a fixed frame rate input and a variable shutter speed input.

6. The method of claim 3, wherein the control data comprises a variable frame rate input and a fixed shutter speed input.

7. The method of claim 3, wherein the control data comprises a ratio of the frame rate to the shutter speed.

8. The method of claim 3, wherein:
   the communication interface is a network interface;
   the control data is received from the video conference system through the network interface;
   the control data comprises a fixed frame rate input and a variable shutter speed input; and
   the variable shutter speed input comprises a ratio of the frame rate to the shutter speed.

9. A system for capturing and transmitting frames in a video conference, the system comprising:
   an image data interface;
   a communication interface; and
   a controller coupled to the image data interface and to the communication interface, the controller operable to:
   receive control data through the communication interface from a remote video conference system, wherein the control data comprises a plurality of variable parameters that establish a relationship between a frame rate and a shutter speed;
   generate a plurality of digital video frames according to the frame rate and the shutter speed; and
   transmit the plurality of digital video frames through the communication interface to the remote video conference system.

10. The system of claim 9, wherein the control data further comprises a frame rate parameter and a variable shutter speed parameter, and the variable shutter speed parameter is a fraction of the frame rate parameter.

11. The system of claim 9, wherein the control data further comprises a ratio of the shutter speed to the frame rate.

12. Software for capturing and transmitting frames in a video conference, the software being embodied in a computer-readable memory comprising computer code such that when executed is operable to:
   receive control data from a remote video conference system, the control data comprising a plurality of variable parameters that establish a relationship between a frame rate and a shutter speed;
   generate a plurality of digital video frames according to the frame rate and the shutter speed; and
   transmit the plurality of digital video frames through a communication interface to the remote video conference system.

13. The software of claim 12, wherein the control data comprises a fixed frame rate input and a variable shutter speed input.

14. The software of claim 12, wherein the control data comprises a variable frame rate input and a fixed shutter speed input.

15. The software of claim 12, wherein the control data comprises a ratio of the frame rate to the shutter speed.

16. The software of claim 12, wherein the control data is received from the remote video conference system through the communication interface.

17. The software of claim 12, wherein:
   the control data is received from the video conference system through the communication interface;
   the control data comprises a fixed frame rate input and a variable shutter speed input; and
   the variable shutter speed input comprises a ratio of the frame rate to the shutter speed.

18. A system for capturing and transmitting frames in a video conference, the system comprising:
   means for receiving control data from a remote endpoint through a network, the control data comprising a plurality of variable parameters that establish a relationship between a frame rate and a shutter speed;
   means for generating a digital video frame according to the frame rate and the shutter speed; and
   means for transmitting the digital video frame through the network to the remote endpoint.

* * * * *